(12) United States Patent
McKee

(10) Patent No.: US 6,915,674 B2
(45) Date of Patent: Jul. 12, 2005

(54) HINGED SAW TABLE, SYSTEM, AND METHOD FOR FORMING AND CUTTING AN ELONGATE WORKPIECE

(76) Inventor: Melvin L. McKee, 2413 January La., Grand Prairie, TX (US) 75050

(*) Notice: Subject to any disclaimer, the term of this patent is extended or adjusted under 35 U.S.C. 154(b) by 6 days.

(21) Appl. No.: 10/218,838

(22) Filed: Aug. 14, 2002

(65) Prior Publication Data

US 2003/0041711 A1 Mar. 6, 2003

Related U.S. Application Data

(60) Provisional application No. 60/316,919, filed on Aug. 29, 2001.

(51) Int. Cl.$^7$ ................................................ B21D 5/08
(52) U.S. Cl. ........................ 72/131; 72/181; 144/286.5; 83/471.3; 83/477.1
(58) Field of Search ........................ 72/129, 131, 181; 144/286.1, 286.5; 83/471.3, 477.1

(56) References Cited

U.S. PATENT DOCUMENTS

| | | | | |
|---|---|---|---|---|
| 2,759,507 A | * | 8/1956 | Davis et al. ................. | 144/285 |
| 2,903,026 A | * | 9/1959 | Frydenlund ................. | 83/468.3 |
| 3,465,793 A | * | 9/1969 | Zuk ........................... | 83/477.1 |
| 3,710,607 A | * | 1/1973 | Beymer ....................... | 72/12.5 |
| 4,465,114 A | * | 8/1984 | Schumacher .............. | 144/286.1 |
| 4,827,819 A | * | 5/1989 | O'Banion et al. .......... | 83/471.3 |
| 5,740,687 A | * | 4/1998 | Meyer et al. ................. | 72/131 |
| 6,530,583 B1 | * | 3/2003 | Mueller ...................... | 280/47.18 |
| 6,565,165 B2 | * | 5/2003 | Switkes ................... | 312/249.13 |
| 6,662,838 B1 | * | 12/2003 | Graham, III .............. | 144/286.5 |

FOREIGN PATENT DOCUMENTS

GB 2148180 A * 5/1985 ............. 144/286.1

* cited by examiner

Primary Examiner—Daniel C. Crane
(74) Attorney, Agent, or Firm—Michael L. Diaz

(57) ABSTRACT

A hinged saw table having a sliding carrier for mounting and sliding a portable table saw. The hinged saw table is mounted adjacent to a forming machine that forms stock that is cut with the portable table saw. Elongate stock exits from an exit aperture in the forming machine, and is directed over the table of the portable table saw mounted upon the movable carrier. The portable table saw may be positioned at the correct point for cutting the stock at a desired length. Square or mitered cuts may be made. For storage purposes, the sliding carrier and table saw may be rotated upward approximately 180 degrees over the top of the forming machine where the carrier and saw rest upside down on a stand. The forming machine may be, for example, a seamless gutter rollformer machine that forms sections of rain gutters for houses or other buildings.

15 Claims, 6 Drawing Sheets

HINGED SAW TABLE, SYSTEM, AND METHOD FOR FORMING AND CUTTING AN ELONGATE WORKPIECE

PRIORITY STATEMENT UNDER 35 U.S.C. § 119(e) & 37 C.F.R. § 1.78

This nonprovisional application claims priority based upon the prior U.S. provisional patent application entitled, "Hinged Saw Table," application No. 60/316,919, filed Aug. 29, 2001, in the name of Melvin L. McKee.

BACKGROUND OF THE INVENTION

1. Technical Field of the Invention

This invention relates to construction equipment and, more particularly, to a hinged saw table that includes a sliding carrier upon which a portable table saw may be mounted, and a hinge mechanism that enables the hinged saw table to be vertically rotated for storage on top of any machine to which it may be attached.

2. Description of Related Art

In saw operations executed on stock or a workpiece, the stock must be held in place to safely perform the saw operation. A serious problem occurs when a work piece unexpectedly falls or shifts. The workpiece can become twisted, changing the angle of the cutting plane and rendering the workpiece unusable. Even worse, an uncontrolled or unstable workpiece can endanger the operator.

In the field of table saws, portable table saws with the ability to execute saw operations such as a miter cut have been constrained to temporary tables, makeshift stands or folding tables. Alternatively, table saws have been placed on a variety of work benches, pick up tail gates, truck beds or just flat on the ground prior to executing a saw operation such as a miter cut at a site away from a shop.

These existing solutions are unsafe at worst and at best awkward and cumbersome. Additionally, many of the existing solutions do not lend themselves to easy storage. It is therefore beneficial to design a hinged saw table that overcomes the limitations of the existing solutions.

In order to overcome the disadvantages of existing solutions, it would be advantageous to provide a table for a portable table saw that allows the operator to execute a variety of saw operations including miter cuts and 90° cuts and that allows for easy storage of the table. The present invention overcomes the limitations of the existing solutions by providing a table for a portable table saw that allows an operator to execute a variety of saw operations while allowing for easy, convenient storage of the table and portable table saw.

SUMMARY OF THE INVENTION

The present invention provides a durably constructed hinged saw table with a moveable carrier upon which a portable table saw may be mounted. The operator can then longitudinally position the saw and angle the saw blade to perform a variety of saw operations including square or miter cuts. The hinged saw table may be secured to a work site machine or workshop machine such as, for example, a seamless gutter rollformer. The hinged saw table is secured in a down (or work) position when being used, and may be pivoted on a hinge mechanism to an up (or stored) position. A hinged mast allows the hinged saw table to rest in an inverted storage position on top of the work site machine or workshop machine. This arrangement provides a simple and inexpensive solution to the problem of safely using and efficiently storing the hinged saw table and saw.

Thus, in one aspect, the present invention is directed to a hinged saw table that includes a sliding carrier for mounting a table saw, and a hinge mechanism connected to the carrier. When the saw table is in a working position, the sliding carrier enables a user to slide the table saw to a desired position for cutting a workpiece. The hinge mechanism enables the carrier to be rotated to a storage position.

In another aspect, the present invention is directed to a system for forming and cutting an elongate workpiece. The system includes a machine that forms the elongate workpiece and expels the workpiece through an exit port, and a hinged saw table mounted to the machine in a location enabling the table saw to receive the workpiece as it exits the machine through the exit port. The hinged saw table includes a sliding carrier for mounting a table saw, and a hinge mechanism connected to the carrier that enables the carrier to be rotated to a storage position. The sliding carrier enables a user to slide the table saw to a desired position for cutting the workpiece.

In yet another aspect, the present invention is directed to a method of forming and cutting an elongate workpiece. The method includes mounting a table saw on a sliding carrier that enables a user to slide the table saw to a desired position for cutting the elongate workpiece. The method also includes mounting the carrier to a machine that forms the elongate workpiece. The carrier is mounted in a location enabling the table saw to receive the workpiece as it exits the forming machine through an exit port. When the elongate workpiece is formed with the forming machine, the workpiece is expelled from the forming machine through the exit port. This is followed by sliding the table saw to the desired position for cutting the elongate workpiece, and cutting the elongate workpiece with the table saw. The method may also include connecting the carrier to a hinge mechanism, and rotating the carrier and table saw to a storage position utilizing the hinge mechanism.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
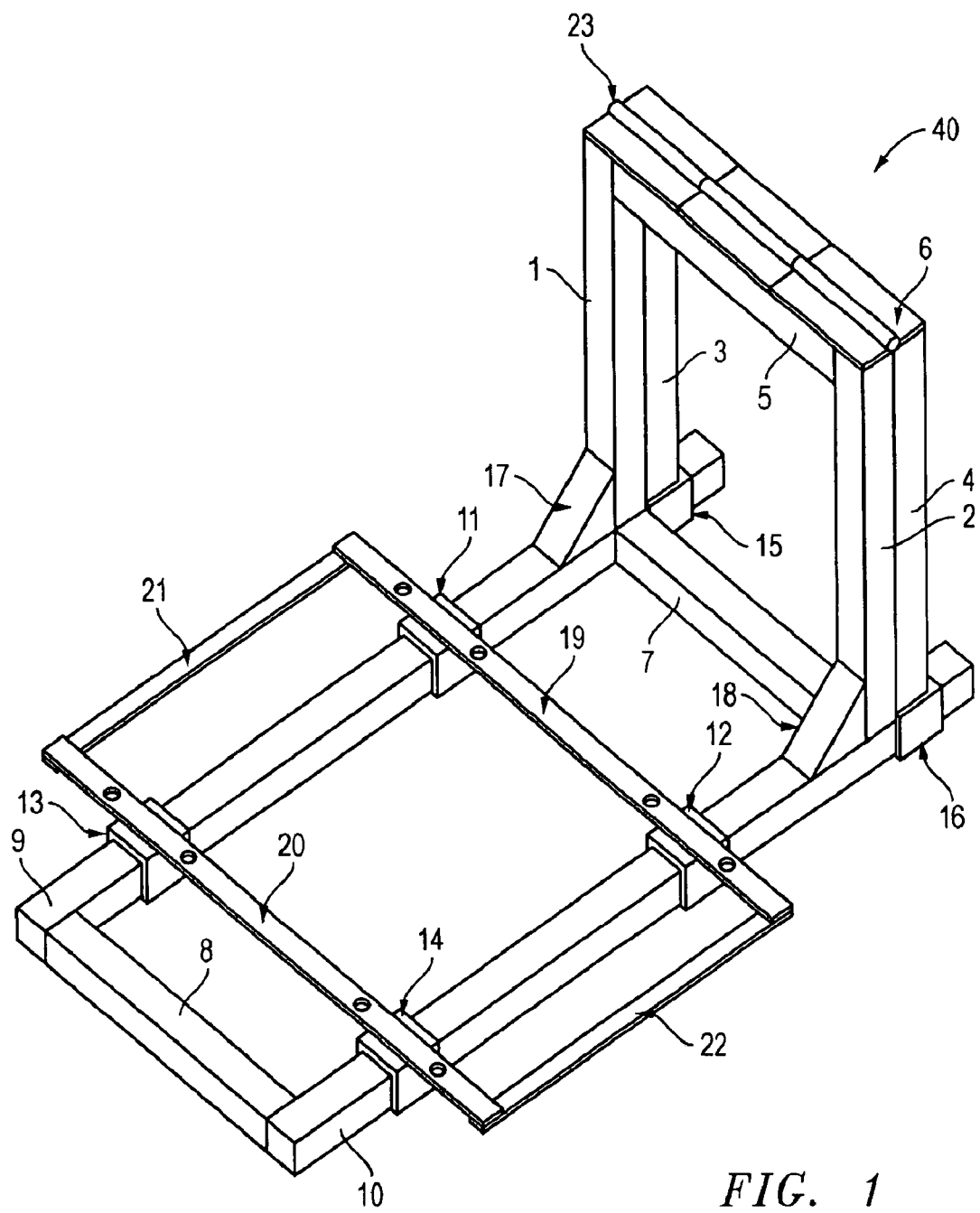
FIG. 1 is a perspective view of the hinged saw table of the present invention including a movable carrier.

Preferred embodiments of the invention will now be described with reference to various examples of how the invention can best be made and used. Like reference numerals are used throughout the description and several views of the drawing to indicate like or corresponding parts.

The present invention provides a hinged saw table, system and method. While the hinged saw table of the present invention may be useful in conjunction with many machines, tools and devices found on a work site, the hinged saw table of the present invention is particularly useful when affixed to a seamless gutter rollformer 42. Again, the hinged saw table may be used in conjunction with any other machine or device where the hinged saw table could be employed, and is particularly useful when used to cut elongate stock that must be cut to a precise length. In the exemplary description herein, the attached machine is referred to as a seamless gutter rollformer.

Referring now to the drawings, and more particularly to FIG. 1, there is a shown a perspective view of an embodiment of the hinged saw table of the present invention, including a movable saw carrier. The hinged saw table is designed to hold and support a portable table saw 41 (see FIG. 6) in a cutting position relative to a workpiece, as shown in more detail with reference to FIG. 6 below.

A hinged mast 40 allows the rear of the hinged saw table to be attached to a machine that forms elongated stock such as a rain gutter. The table may be attached to the machine in any conventional manner known in the art. Preferably, the hinged saw table is welded or bolted to the machine. When the hinged saw table is in the down position or work position, the elongated stock exits the machine and passes over the top of the saw table. The hinged saw table can then be used for performing saw operations. Preferably, the table is mounted in a position which provides approximately ¼ inch of clearance between the support surface of a mounted portable table saw and the bottom of the stock so as to prevent scratching the stock as it exits the forming machine and travels along the top of the support surface. Extremely long pieces of stock may be supported by a separate roller stand (not shown) that is set up at a distance from the saw table to support the still traveling stock.

The hinged saw table includes a moveable carrier upon which the portable table saw 41 is mounted. The carrier includes four slides 11–14, connected by frame pieces 19–22, that slide along two base rails 9 and 10. In this manner, the mounted table saw can be precisely positioned to cut the elongated stock at the desired length. The saw may also be rotated in the horizontal plane to enable angled mitre cuts of the stock.

The hinged saw table includes a support table with a hinged mast 40 which includes a hinge 23. The hinged mast may be hinged by any mechanism allowing the table to pivot approximately 180 degrees, upward and over the top of an attached seamless gutter rollformer from a working position to an inverted storage position (see FIG. 6).

The hinged mast 40 includes a stationary part and a rotating part. The stationary part includes vertical side pieces 3 and 4, and upper cross piece 6. The rotating part includes vertical side pieces 1 and 2 which are joined by an upper cross piece 5, and a lower cross piece 7. Vertical side pieces 1 and 2 are affixed to horizontal base rails 9 and 10. Triangular corner gussets 17 and 18 may be utilized to stabilize and strengthen the connection of the vertical side pieces to the horizontal base rails.

Figure 2:
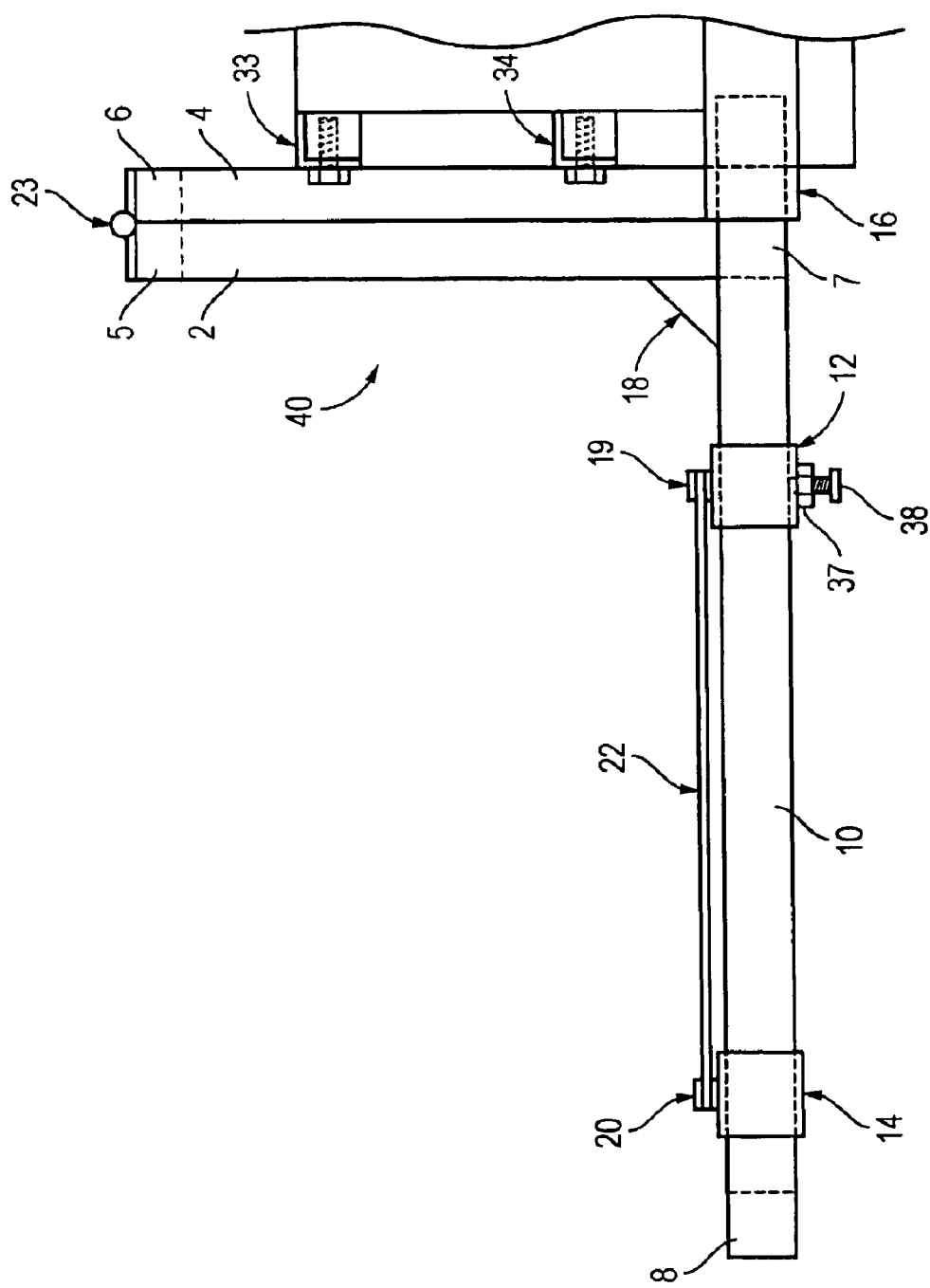
FIG. 2 is a side elevation view of the hinged saw table of the present invention.

FIG. 2 is a side elevation view of the hinged saw table. Mounting sockets 15 and 16 are utilized to attach the saw table to the gutter rollformer by inserting stationary portions of the base rails 9 and 10. The sockets center and support the hinged saw table. The sockets provide rigidity and support to the hinged saw table while allowing the hinged saw table to be moved from the work (down) position to the stored (up) position. Additionally, brackets 33 and 34, which may be, for example, two pieces of angle iron, are added to the gutter rollformer 42 for the purpose of attaching the hinged saw table. The table is preferably mounted directly to the gutter rollformer so that proper alignment can be maintained with the gutter workpiece as it exits the rollformer. Alternatively, the saw table may be mounted to the rollformer stand 43 if measures to ensure proper alignment are taken. Other methods of mounting may also be utilized to center the hinged saw table in the work position.

When a portable table saw capable of making mitered cuts is mounted on the moveable carrier, a saw operator can make a square cut though the material or a left-hand or a right-hand miter cut through the material with the angle of the cuts dependant upon the capability of the selected model of the portable table saw.

The slide 11 has a hole drilled in the underside, and a nut 37 is welded to the slide over the hole. A locking bolt 38 screws into the nut 37 and, when tightened, contacts the rail 9 to secure the moveable carrier in position. The locking bolt is tightened to secure the moveable carrier in the correct position, and is loosened to release the moveable carrier.

Figure 3:
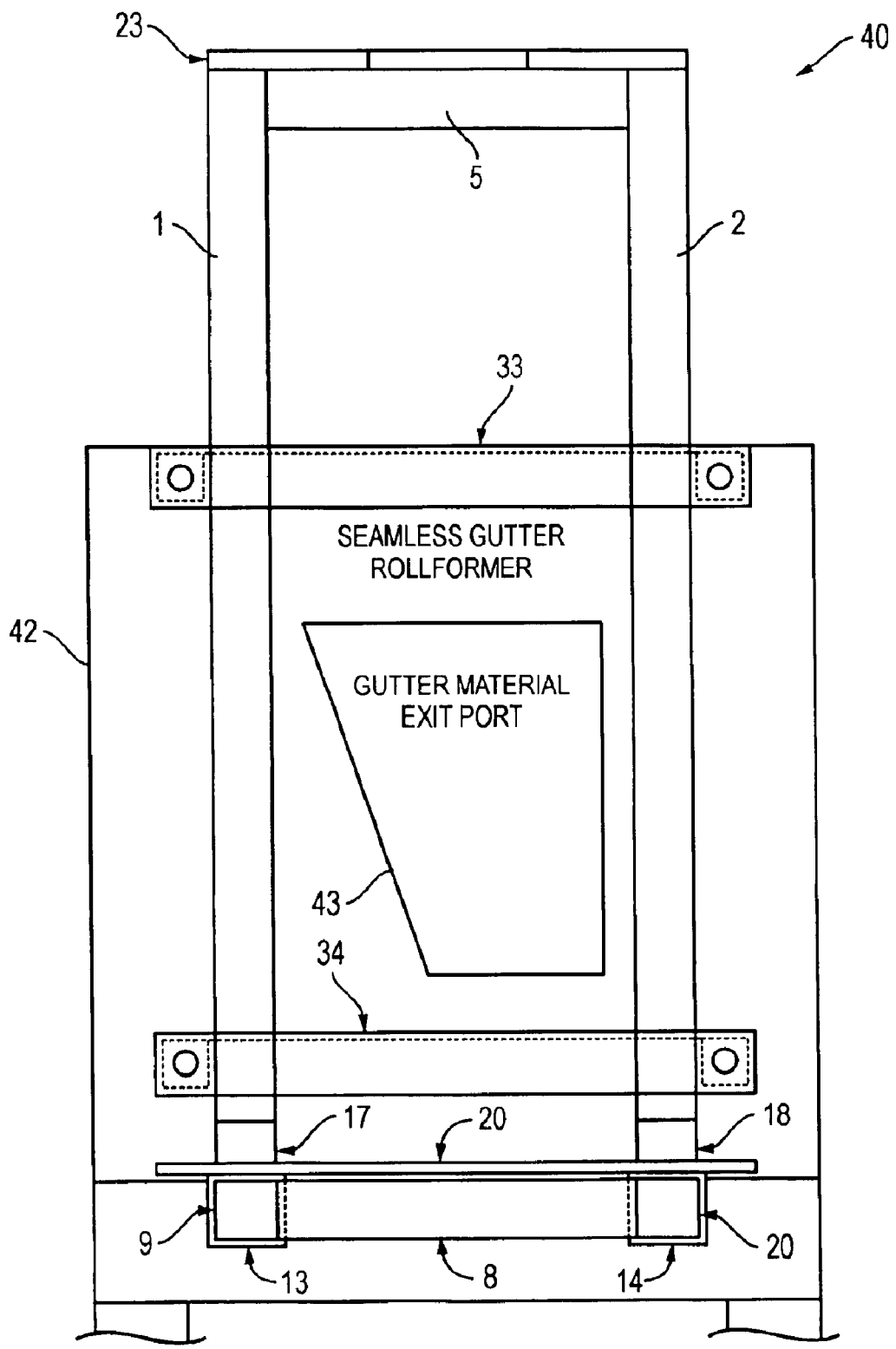
FIG. 3 is a front elevation view of the hinged saw table of the present invention when attached to a seamless gutter rollformer.

FIG. 3 is a front elevation view of the hinged saw table of the present invention when attached to a seamless gutter rollformer 42. As shown, the gutter material exits the rollformer from an exit port 43 located approximately ¼ inch above the cutting surface of the portable table saw when it is mounted on the movable carrier to allow a saw operator to perform saw operations.

Figure 4:
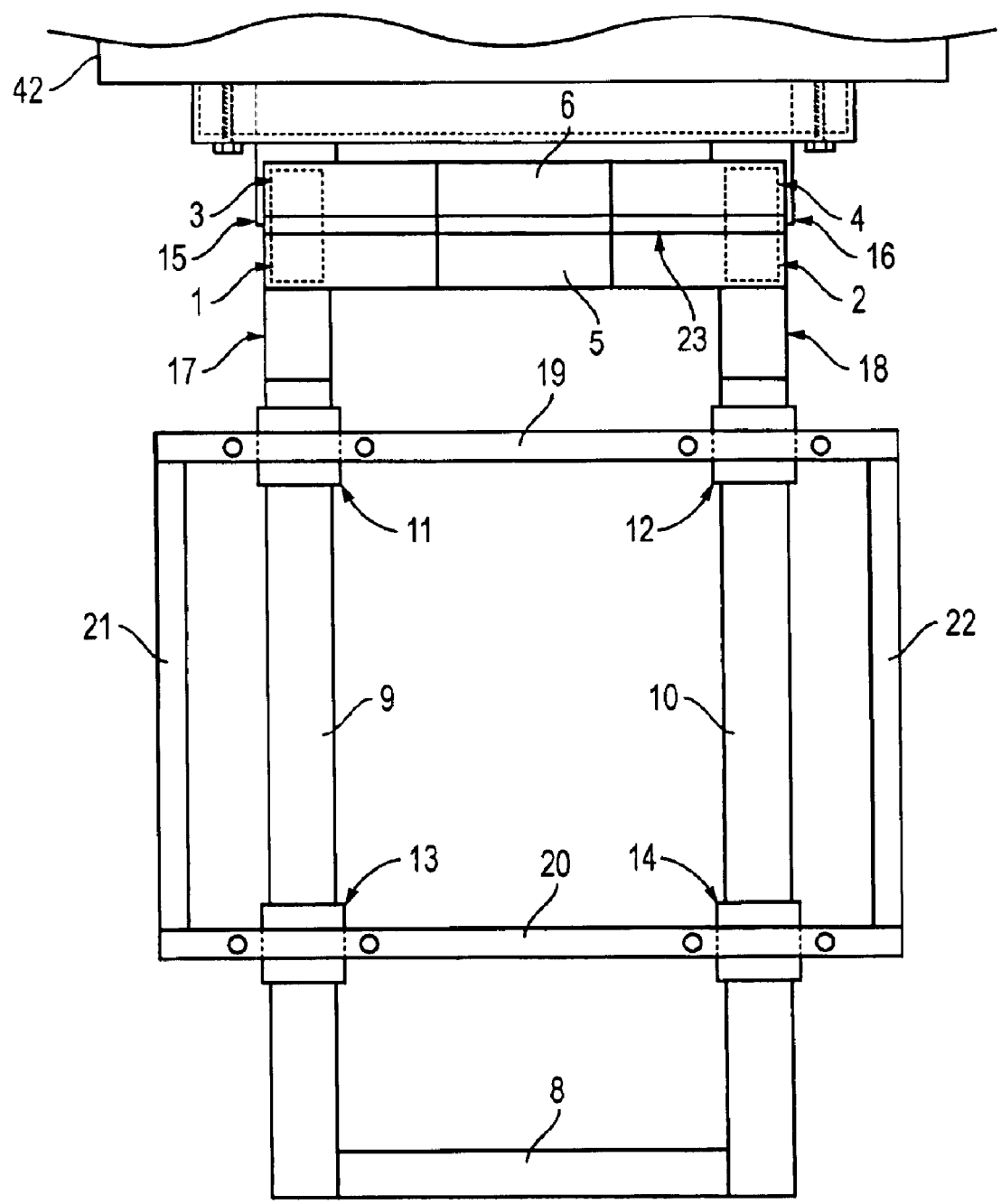
FIG. 4 is a top plan view of the hinged saw table of the present invention when attached to the seamless gutter rollformer.

FIG. 4 is a top plan view of the hinged saw table of the present invention when attached to the seamless gutter rollformer 42. This view illustrates the moveable carrier upon which the portable power miter saw 41 may be mounted. Once the saw is mounted, being on a moveable carrier, it may be moved toward or away from the exit port 43 along the length of the workpiece exiting from the seamless gutter rollformer. This allows the operator to easily use the saw blade as an indicator to determine where and how the product shall be cut, rather than performing the difficult task of attempting to stop the material precisely at a predetermined length for severing with a fixed guillotine or some other device.

Figure 5:
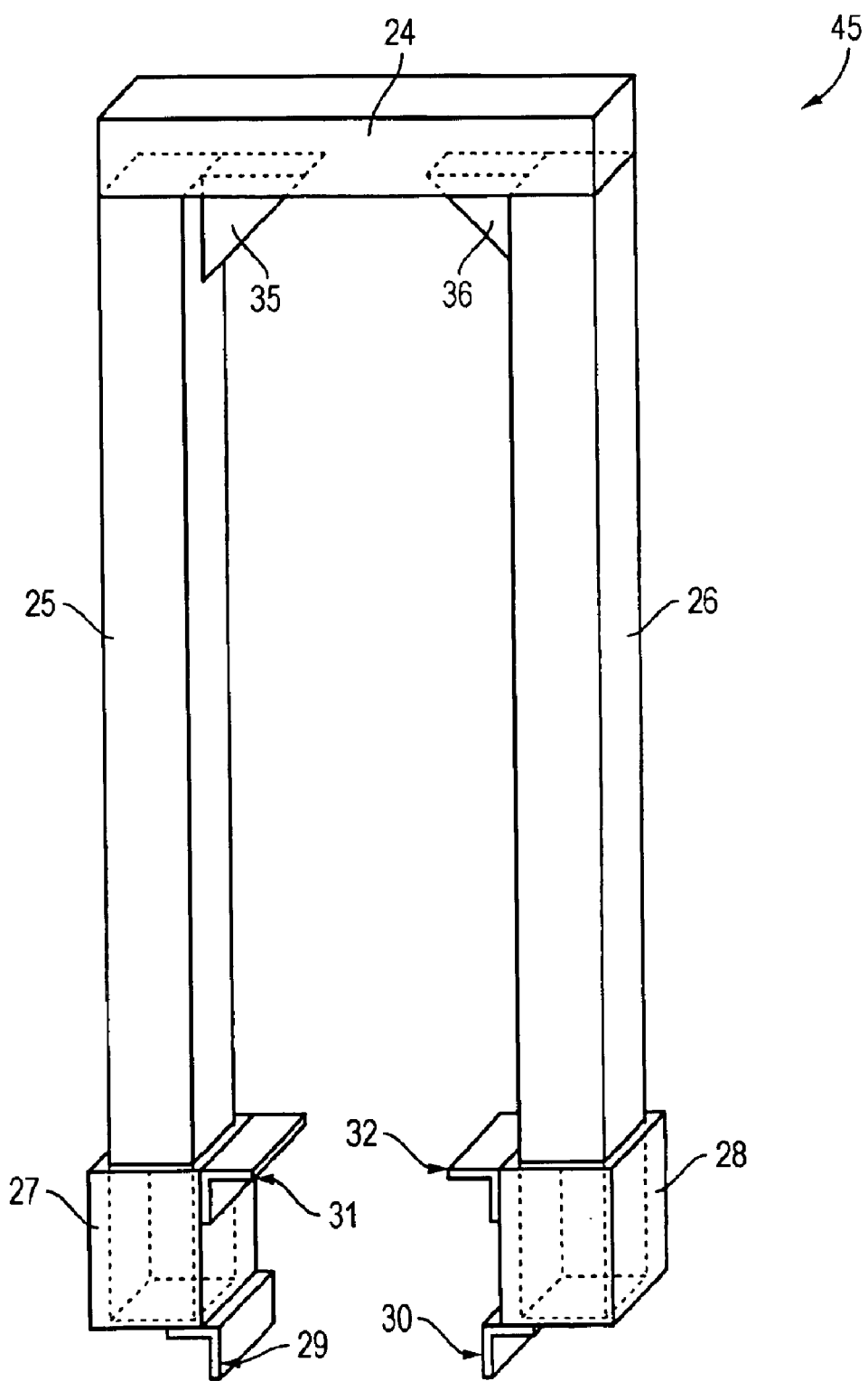
FIG. 5 is a perspective view of a hinged saw table storage stand and sockets.

Referring now to FIG. 5, a perspective view of a table storage stand 45 is shown. Sockets 27 and 28, and brackets 29–32 are affixed to the top of the seamless gutter rollformer 42 to support the legs 25 and 26 of the stand. The stand is attached to the top of the seamless gutter rollformer to support the hinged saw table when it is in the up (storage) position. The top 24 of the stand is at an elevation to provide clearance for the mounted table saw 41 while suspended upside down in the storage position above the seamless gutter rollformer. Gussets 35 and 36 may be mounted in the corners of the stand to provide additional support and rigidity to the stand.

Figure 6:
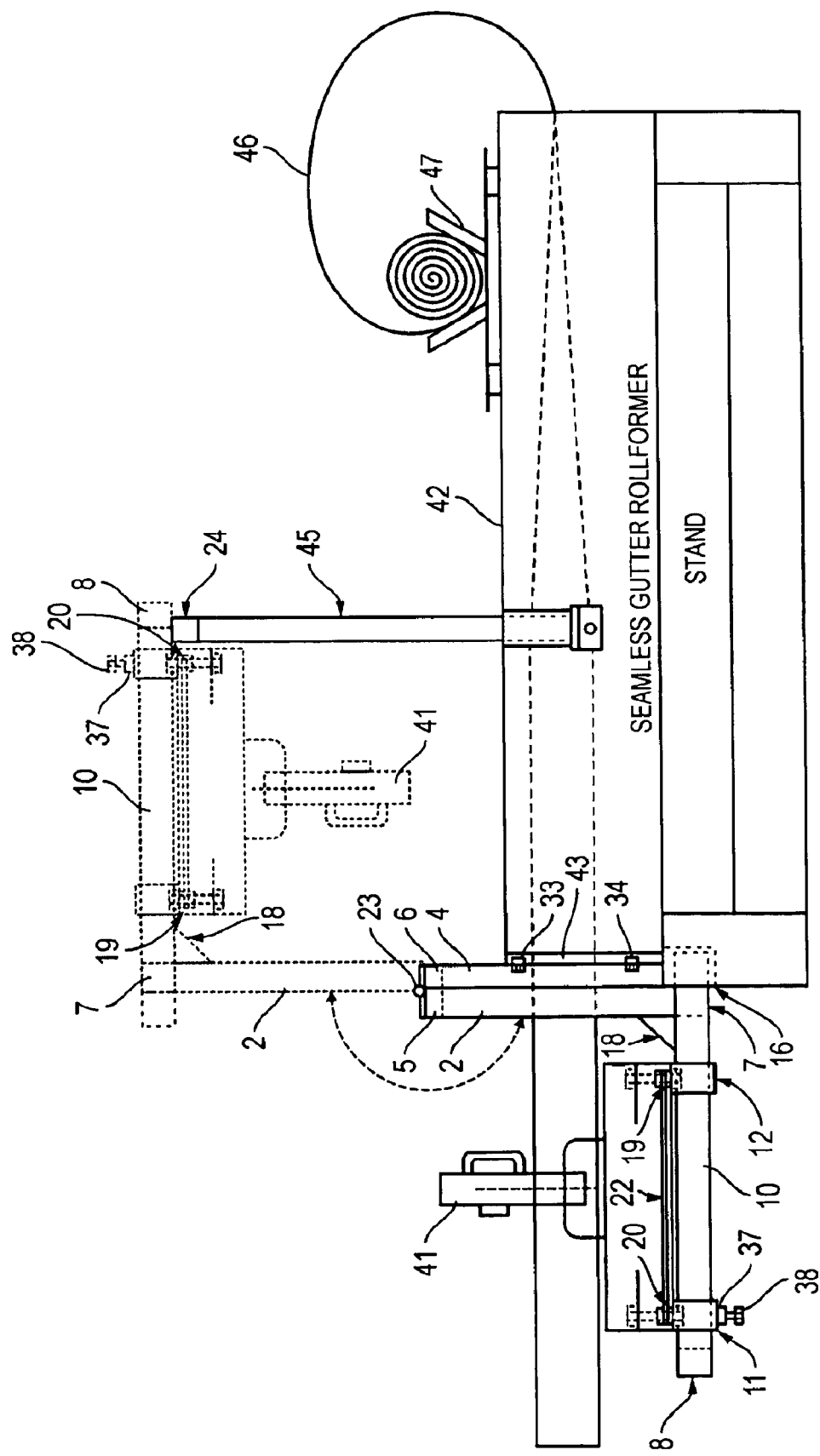
FIG. 6 is a side elevation view of the hinged saw table attached in a working position to the seamless gutter rollformer, and illustrating a storage position in phantom.

FIG. 6 is a side elevation view of the hinged saw table attached in the working position to the seamless gutter rollformer 42, and illustrating the storage position in phantom. Sheet metal stock 46 for a rain gutter may be held in a cradle 47 as part of the seamless gutter rollformer. The stock enters the back end of the rollformer where it is shaped into the desired shape of the rain gutter. The shaped gutter workpiece then exits the rollformer through the exit port 43, and is held approximately ¼-inch above the support surface of the table saw 41.

In the prior art, workpieces produced by the seamless gutter rollformer, have been typically cut with a hand-held tool such as, for example, a pair of tin snips, or have been square-cut with a guillotine device, and then mitered or altered with tin snips. In order to make the square cut at the proper length, the user has had to painstakenly adjust the rollformer to extend or retract the workpiece until the desired cutting point is properly positioned at the guillotine device.

With the hinged saw table of the present invention, however, the portable table saw 41 is mounted on the sliding carrier. As the workpiece exits the rollformer 42, the workpiece can be stopped at approximately the desired length. The saw table carrier is movable along the length of the horizontal base rails 9 and 10, and thus the table saw can be easily positioned along the length of the workpiece (within the travel range of the moveable carrier) to cut the workpiece precisely at the desired length. with the present invention, it is no longer necessary for the operator to attempt to control the output of the rollformer machine to precisely locate the material in the exact position for cutting by a fixed guillotine or other device.

Additionally, the portable table saw mounted on the moveable saw table carrier is capable of making angled miter saw cuts, and may be capable of sawing either a left-hand or a right-hand saw cut, depending upon the capability of the selected model portable table saw.

As an additional benefit of the present invention, it should be noted that when the hinged saw table is deployed to the down (work) position, there exists only a freestanding platform with the moveable carrier and portable table saw attached. The platform is free of any legs or braces that the operator might otherwise trip on, hit his legs on, or that might entangle electric extension cords or cause some other problem or inconvenience.

When the gutter rollformer and hinged saw table are in a truck, trailer or van, and the table and saw are in the down (work) position, the operator can operate his machine freely from the ground and enjoy the luxury of sawing straight cuts or mitered cuts extremely accurately without the trouble of using any of a variety of snips, without being limited to a straight cut with a guillotine device, or without having to move and set up a temporary makeshift saw support.

As an additional feature, when the hinged saw table is deployed and used in the work position, the base of the saw table acts as a stand to catch the end of the product when it is cut, thereby eliminating the need for an additional stand.

The portable table saw may be removed and remounted facing the opposite direction on the saw carrier. This feature makes the invention equally useful to people who are left-handed or right-handed, and simplifies the job of cutting a left-handed mitered cut or a right-handed mitered cut.

When not in use, the hinged saw table may be rotated up and over the top of the gutter rollformer 42 to which it is attached, resting upside down on the support stand 45 which is designed to provide clearance between the inverted portable table saw 41 and the top of the rollformer. This provides storage for the portable table saw with no necessity of removing the portable table saw from the movable carrier. The locking bolt 38 secures the moveable carrier in position to the base rail 9 to prevent the carrier from sliding during rotation and storage.

If the seamless gutter rollformer is mobile (i.e., is mounted in a van, truck, or trailer), and is located far enough forward in the vehicle, the rear doors or tailgate may be closed and secured unimpeded when the hinged saw table is rotated to the stored position above the seamless gutter rollformer machine.

Even if the seamless gutter rollformer 42 is stationary and being used in a factory or warehouse, the present invention provides additional advantages. First, the hinged saw table provides storage for the saw 41 and clears the end of the seamless gutter rollformer allowing easy cleaning around the machine. Second, clearance for conveyance of vehicles and material around the end of the machine is provided with less likelihood of an accident causing damage to the hinged saw table or the portable table saw. Finally, the storage position prevents an employee from injuring himself by inadvertently walking into the table or snagging himself on it.

Thus, with the hinged saw table rotated to the up (stored) position, removal of the saw 41 is unnecessary. In addition, storage of the hinged saw table on the storage stand 45 facilitates quick start up and operation by enabling the saw table and saw to be quickly rotated to the down (work) position.

Even though FIG. 6 depicts a seamless gutter rollformer, it should be understood by one skilled in the art that the hinged, adjustable saw table is equally well-suited for operation with other types of machines and equipment.

It is thus believed that the operation and construction of the present invention will be apparent from the foregoing description. Although the invention has been described with reference to certain exemplary arrangements, it is to be understood that the forms of the invention shown and described are to be treated as preferred embodiments. Various changes, substitutions and modifications can be realized without departing from the scope of the invention as defined in the following claims.

What is claimed is:

1. A hinged saw table comprising:
   a sliding carrier for mounting a table saw, said sliding carrier enabling a user to longitudinally slide the table saw to a desired position for cutting a workpiece;
   a hinge mechanism connected to the carrier that enables the carrier to be rotated vertically over to a storage position; and
   means for mounting the saw table in a location enabling the table saw to receive the workpiece as it exits a machine, the means for mounting the saw table having a mounting bracket attached to a seamless gutter rollformer.

2. The hinged saw table of claim 1 wherein the sliding carrier includes a plurality of slides mounted on at least one base rail, said base rail extending from the machine parallel to the workpiece as it exits the machine.

3. The hinged saw table of claim 1 wherein the hinge mechanism includes a vertical mast comprising:
   a stationary portion that attaches to the machine;
   a rotating portion to which the base rail is attached; and
   a hinge connecting the stationary portion and the rotating portion, said hinge enabling the rotating portion, with the attached base rail, carrier, and saw to rotate to the storage position.

4. The hinged saw table of claim 3 wherein the mast has a height that is higher than the top of the machine, and the hinge is located at the top of the mast, thereby enabling the rotating portion, with the attached base rail, carrier, and saw to rotate to an inverted storage position on top of the machine.

5. The hinged saw table of claim 4 wherein the carrier includes means for mounting a table saw having a horizontally rotatable base that enables the saw to cut the workpiece perpendicular to a longitudinal axis, or to cut a mitre cut at an angle to the longitudinal axis.

6. A system for forming and cutting an elongate workpiece, comprising:

a machine that forms the elongate workpiece and expels the workpiece through an exit port; and a hinged saw table mounted to the machine in a location to receive the workpiece as it exits the machine through the exit port, said hinged saw table comprising:

a sliding carrier for mounting a table saw, said sliding carrier enabling a user to longitudinally slide the table saw to a desired position for cutting the workpiece; and a hinge mechanism connected to the carrier that enables the carrier to be rotated vertically over to a storage position.

7. The system for forming and cutting an elongate workpiece of claim 6 wherein the sliding carrier includes a plurality of slides mounted on at least one base rail, said base rail extending from the machine parallel to the workpiece as it exits the machine.

8. The system for forming and cutting an elongate workpiece of claim 7 wherein the hinge mechanism includes a vertical mast comprising:

a stationary portion that attaches to the machine;

a rotating portion to which the base rail is attached; and a hinge connecting the stationary portion and the rotating portion, said hinge enabling the rotating portion, with the attached base rail, carrier, and saw to rotate to the storage position.

9. The system for forming and cutting an elongate workpiece of claim 8 wherein the mast has a height that is higher than the top of the machine, and the hinge is located at the top of the mast, thereby enabling the rotating portion, with the attached base rail, carrier, and saw to rotate to an inverted storage position on top of the machine.

10. The system for forming and cutting an elongate workpiece of claim 9 wherein the carrier includes means for mounting a table saw having a horizontally rotatable base that enables the saw to cut the workpiece perpendicular to a longitudinal axis, or to cut a mitre cut at an angle to the longitudinal axis.

11. The system for forming and cutting an elongate workpiece of claim 6 wherein the machine is a seamless gutter rollformer, and the elongate workpiece is a seamless metal rain gutter.

12. A method of forming and cutting an elongate workpiece comprising the steps of:

mounting a table saw on a sliding carrier, said sliding carrier enabling a user to longitudinally slide the table saw to a desired position for cutting the elongate workpiece;

mounting the sliding carrier to a machine that forms the elongate workpiece, said sliding carrier being mounted in a location enabling the table saw to receive the workpiece as it exits the forming machine through an exit port and a slide that is movably attached to a base rail, the step of mounting the sliding carrier to the machine including mounting a fixed end portion of the base rail to the machine;

forming the elongate workpiece with the forming machine;

expelling the workpiece from the forming machine through the exit port;

sliding the table saw to the desired position for cutting the elongate workpiece;

cutting the elongate workpiece with the table saw;

connecting the carrier to a binge mechanism, the step of connecting the carrier to a hinge mechanism including the steps of:

attaching a stationary portion of a vertical mast to the machine;

attaching a rotating portion of the vertical mast to the base rail;

mounting a hinge at the to the of the mast, said hinge rotatably connecting the rotating portion to the stationary portion of the vertical mast; and connecting the carrier to the rotating portion of the vertical mast; and rotating the carrier and table saw to a storage position utilizing the hinge mechanism.

13. The method of forming and cutting an elongate workpiece of claim 12 wherein the vertical mast has a height that is higher than the top of the machine, and the step of rotating the carrier and table saw to a storage position includes rotating the carrier and table saw to an inverted storage position on top of the machine.

14. The method of forming and cutting an elongate workpiece of claim 12 wherein the machine is a seamless gutter rollformer, and the elongate workpiece is a seamless metal rain gutter, and the step of cutting the elongate workpiece with the table saw includes cutting the rain gutter perpendicular to a longitudinal axis.

15. The method of forming and cutting an elongate workpiece of claim 12 wherein the machine is a seamless gutter rollformer, and the elongate workpiece is a seamless metal rain gutter, and the step of cutting the elongate workpiece with the table saw includes cutting the rain gutter at a 45 degree angle to a longitudinal axis.

* * * * *